US009998403B2

(12) United States Patent
Ko et al.

(10) Patent No.: US 9,998,403 B2
(45) Date of Patent: Jun. 12, 2018

(54) MOST CONNECTION METHOD FOR EGRESS PORT SELECTION IN A HIGH PORT COUNT SWITCH

(71) Applicant: Brocade Communications Systems, Inc., San Jose, CA (US)

(72) Inventors: Kung-Ling Ko, Union City, CA (US); Tony Nguyen, San Jose, CA (US); Ye Thein, Van Nuys, CA (US)

(73) Assignee: Brocade Communications Systems LLC, San Jose, CA (US)

( * ) Notice: Subject to any disclaimer, the term of this patent is extended or adjusted under 35 U.S.C. 154(b) by 336 days.

(21) Appl. No.: 14/928,742

(22) Filed: Oct. 30, 2015

(65) Prior Publication Data

US 2016/0149823 A1    May 26, 2016

Related U.S. Application Data

(60) Provisional application No. 62/084,463, filed on Nov. 25, 2014.

(51) Int. Cl.
*G06F 15/16* (2006.01)
*H04L 12/931* (2013.01)

(52) U.S. Cl.
CPC ................... *H04L 49/352* (2013.01)

(58) Field of Classification Search
CPC ....................................... H04L 47/625
USPC ......................................... 709/223
See application file for complete search history.

(56) References Cited

U.S. PATENT DOCUMENTS

| | | | |
|---|---|---|---|
| 2002/0181474 A1* | 12/2002 | Niu | H04L 45/60 370/398 |
| 2003/0067878 A1* | 4/2003 | Zboril | H04L 12/5602 370/235 |
| 2004/0223762 A1* | 11/2004 | Lee | H04Q 11/0005 398/51 |
| 2005/0036485 A1* | 2/2005 | Eilers | H04L 41/0663 370/389 |
| 2014/0022903 A1* | 1/2014 | Shinohara | H04L 47/122 370/235 |
| 2014/0376546 A1* | 12/2014 | Miller | H04L 49/1515 370/388 |
| 2015/0085861 A1* | 3/2015 | Griswold | H04L 47/50 370/390 |
| 2015/0089047 A1* | 3/2015 | Matthews | H04L 1/0082 709/224 |

(Continued)

*Primary Examiner* — Hamza N Algibhah
(74) *Attorney, Agent, or Firm* — Blank Rome, LLP

(57) ABSTRACT

A switch according to the present invention can have a number of ports in an ASIC greater than the ASIC clock speed divided by the network protocol rate. The switch ASIC contains multiple blocks, each block having a number of ports equal to the ASIC clock speed divided the packet rate of the protocol. Each block has a number of queues equal to the total number of ports on the ASIC to receive packets. The queues are scheduled from each block into a number of outputs equal to the number of blocks. The outputs of each block are received by a scheduler which evaluates the packets available at the outputs of each block to determine the combination of outputs which provides the most connections that are ready for transmission. The combination with the most connections is then utilized to provide packets to the egress section of each block.

20 Claims, 4 Drawing Sheets

(56) References Cited

U.S. PATENT DOCUMENTS

2015/0098337 A1* 4/2015 Enkovaara ............ H04L 49/506
  370/236
2016/0036699 A1* 2/2016 Kollu ...................... H04L 45/74
  370/392
2017/0126588 A1* 5/2017 Anand .................... H04L 49/30

* cited by examiner

MOST CONNECTION METHOD FOR EGRESS PORT SELECTION IN A HIGH PORT COUNT SWITCH

CROSS REFERENCE TO RELATED APPLICATION

This application claims the benefit of U.S. Provisional Patent Application No. 62/084,463, entitled "Most Connection Method for Egress Port Selection in a High Port Count Switch," filed Nov. 25, 2014, which is hereby incorporated by reference as if reproduced in its entirety.

BACKGROUND OF THE DISCLOSURE

1. Field of the Invention

Embodiments in the present disclosure relates generally to the field of computer networking, and in particular to techniques for improving processing power of network switches, routers, bridges and/or other types of network switching devices.

2. Description of the Related Art

The rapid growth of internet demand continues to push today's communication and data networks to support faster data rates and enhanced quality of services. Today's communication and data networks, such Ethernet networks, commonly comprise network nodes, such as switches and routers that forward and transport data packets to different destinations within the networks. The processing power and throughput of the network nodes may depend at least in part on the processing power of its packet processing application-specification integrated circuit (ASIC). Specifically, the network nodes use the packet processing ASIC to build and maintain forwarding tables, (e.g., tables that map media access control (MAC) addresses to ports) to properly route and forward data packets. Although the demand to increase throughput continues to grow, designs for improving the network nodes and their packet processing ASIC components may be constrained by cost, power, and size requirements.

The processing power of a packet processing ASIC is generally determined by its clock speed. Generally, the faster the clock speed, the more processing power and throughput the packet processing ASIC may provide to a network node for processing and forwarding data packets. When a packet processing ASIC is used to process data packets, the clock speed may limit the number of packets the packet processing ASIC is able to process for given time duration (e.g., about a second). In particular, a networking protocol, such as Ethernet, may be configured to transfer a set number of data packets per second to a port based on the protocol rate. For the packet processing ASIC to meet the protocol rate, the maximum number of ports the packet processing ASIC can process may be determined by the ASIC's clock speed divided by the number of data packets per second at a port. For example, a 10 Gigabit per second Ethernet link can transfer up to about 15 million packets in one second for a port. If a packet processing ASIC is configured to operate at about 480 megahertz (MHz), and assuming data packet processing requires one ASIC clock cycle, then the packet processing ASIC can potentially process up to 480 million packets per second or up to 32 ports of traffic. If 480 MHz is the upper limit of the clock speed in a specific semiconductor technology, implementing a packet processing ASIC that includes more than 32 ports of 10 Gigabit per second Ethernet becomes difficult. Unfortunately, as protocol rates continue to increase to handle ever growing amounts of network traffic, network nodes and the packet processing ASIC components may need to increase their processing throughput to manage the ever increasing amount of data traffic transported over modern networks.

SUMMARY OF THE DISCLOSURE

According to the embodiments presented in this disclosure, a network node that comprises a number of ports in an ASIC that is greater than the ASIC clock speed divided by a network protocol rate. For example, one switch ASIC can have 128 10 Gigabits per second (Gbps) ports with a clock rate of about 480 MHz. The ASIC may comprise a plurality of packet processing blocks, where each packet processing block has a number of ports equal to the ASIC clock speed divided by the packet rate of the protocol. For example, each packet processing block may have 32, 10 Gbps ports for about a 480 MHz clock rate. If the number of packet processing blocks is four, the total ASIC port count is 128 ports.

Each packet processing block comprises a number of queues equal to the total number of ports on the ASIC to receive packets. The queues are scheduled from each packet processing block into a number of outputs equal to the number of blocks. The outputs of each block are received by a scheduler that evaluates the data packets available at the outputs of each packet processing block to determine the combination of outputs that provides the most connections of the total number of connections that are ready for transmission. The combination with the most connections is then utilized to provide packets to the egress section of each block.

BRIEF DESCRIPTION OF THE FIGURES

The accompanying drawings, which are incorporated in and constitute a part of this specification, illustrate an implementation of apparatus and methods consistent with the present invention and, together with the detailed description, serve to explain advantages and principles consistent with the invention.

DETAILED DESCRIPTION OF THE PREFERRED EMBODIMENTS

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques described below, including the exemplary designs and implementations illustrated and described herein, but may be modified within the scope of the appended claims along with their full scope of equivalents.

Unless otherwise specified within the disclosure, the terms "filter table," "forwarding information base (FIB)," "forwarding table," and "content addressable memory (CAM) table" may be considered synonymous and may be used interchangeably throughout the disclosure.

Disclosed herein are various embodiments that increase the number of packet processing ASIC ingress and/or egress ports used for forwarding data packets at a pre-defined packet rate associated with a network protocol. The number of packet processing ASIC ingress and/or egress ports may be increased without increasing the clock speed of the packet processing ASIC. The packet processing ASIC may be divided into a plurality of packet processors that process packets received from a portion of the ASIC ingress ports. The number of ASIC ingress ports that are assigned to a packet processor may be equal to the maximum clock speed of the packet processing ASIC divided by the packet rate of the networking protocol. Each packet processor may place the incoming data packets into a plurality of queues, where the number of queues may be equal to the number of egress ports. Data packets from the queues are then internally sent to a scheduler using a plurality of packet processor output ports. The number of packet processor outputs may be equal to the number of egress transmission logic blocks within the packet processing ASIC. The scheduler may then forward the data packets to the egress transmission logic blocks that output the data packets to the corresponding egress ports.

Figure 1:
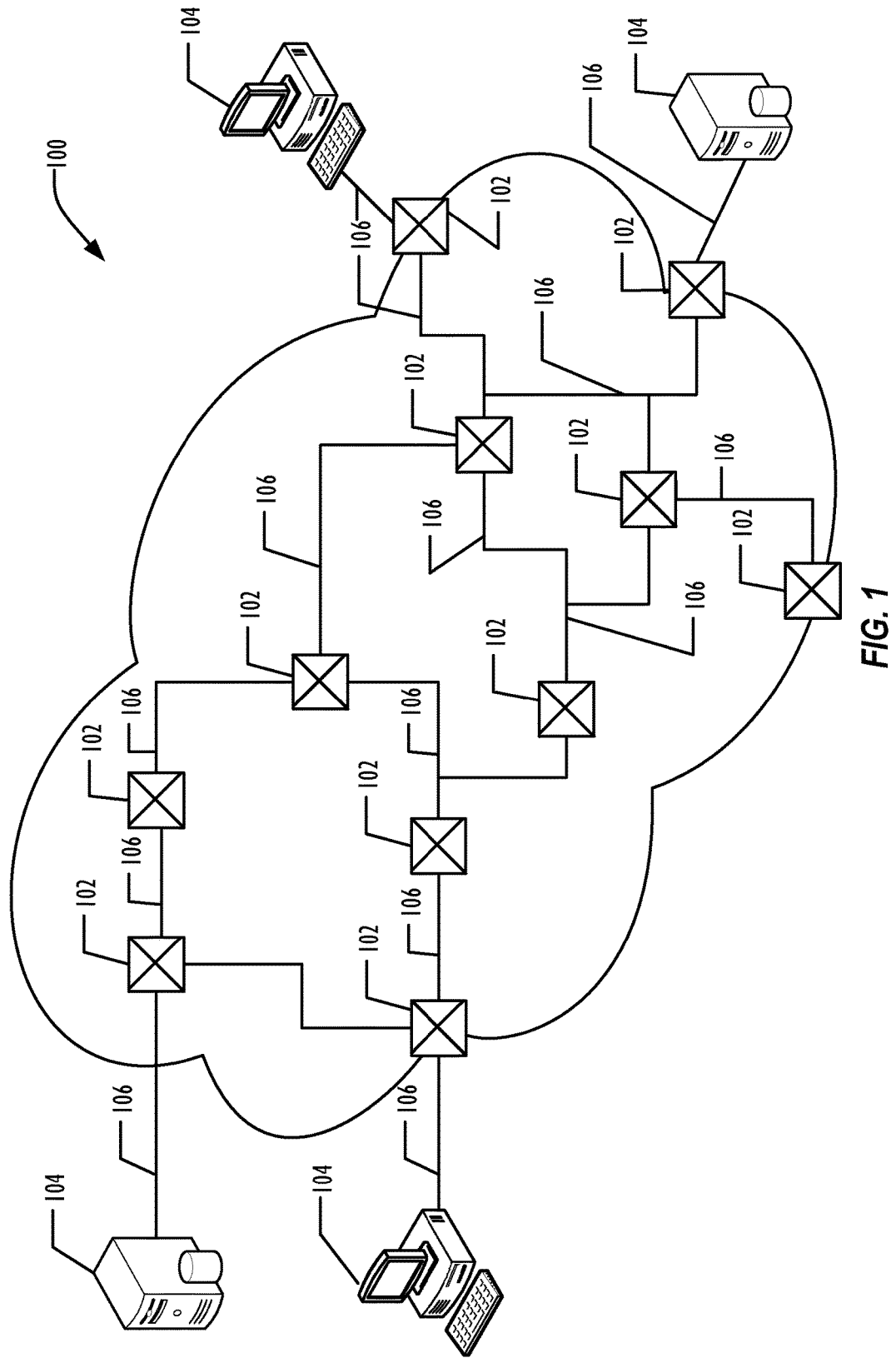
FIG. 1 is a schematic diagram of an embodiment of a network system where embodiments of the present disclosure may operate herein.

FIG. 1 is a schematic diagram of an embodiment of a network system 100 where embodiments of the present disclosure may operate herein. Network system 100 may be configured to operate in the electrical, optical, or a combination of both domains and transport data packets using one or more networking protocols that include, but are not limited to Internet Protocol (IP), Fibre Channel (FC), Ethernet, and/or Multiprotocol Label Switching (MPLS). In one embodiment, network system 100 may route data between network nodes 102 without using pre-calculated paths, while in other embodiments, network system 100 may route data between network nodes 102 along a pre-calculated path (e.g. traffic engineering paths).

As shown in FIG. 1, network system 100 may comprise network nodes 102 and end nodes 104 that are interconnected using links 106. The network nodes 102 may be any type of network switching device that forward data traffic within network system 100, such as switches, bridges, and/or routers. The end nodes 104 may be any suitable device that originates (e.g., a source node) and/or receives data (e.g., a destination node) to and from a network. Non-limiting examples of end nodes 104 include computers, servers, hosts, virtual machines (VMs), user terminals, and/or storage devices. The links 106 that interconnect network nodes 102 and end nodes 104 to form network system 100 may comprise physical links, wireless links, logical links and/or a combination thereof.

In one embodiment, network system 100 may be an Ethernet network that supports 10 Gigabit Ethernet. In this embodiment, links 106 that interconnect network nodes 102 and end nodes 104 may be physical links, such as copper and/or fiber optics connections that offer full duplex communication. As an Ethernet network that supports 10 Gigabit Ethernet, the links 106 may support transmission of Ethernet frames at a rate of about 10 Gbps. In other words, links 106 may pass up to about 15 million Ethernet data packets in one second. Network nodes 102 may each comprise a packet processing ASIC to process and forward the data packets traversing through the links 106 by building and managing forwarding tables. Other embodiments of network system 100 may implement other Ethernet speed standards, such as 25 Gigabit, 40 Gigabit and/or 100 Gigabit Ethernet.

As persons of ordinary skill in the art are aware, although FIG. 1 illustrates a specific network system 100, the disclosure is not limited to that application and/or the specific embodiment illustrated FIG. 1. For instance, embodiments of the present disclosure may include a network system 100 that comprises a plurality of networks using a plurality of networking protocols. Additionally, in some embodiments, network system 100 may separate out the data plane and control plane such that network nodes 102 operate in the data plane and the control plane is implemented using a centralized controller, such as software-defined networking (SDN). The use and discussion of FIG. 1 is only an example to facilitate ease of description and explanation, and thus, the network nodes 102 may be used in a variety of different types of networks.

Figure 2:
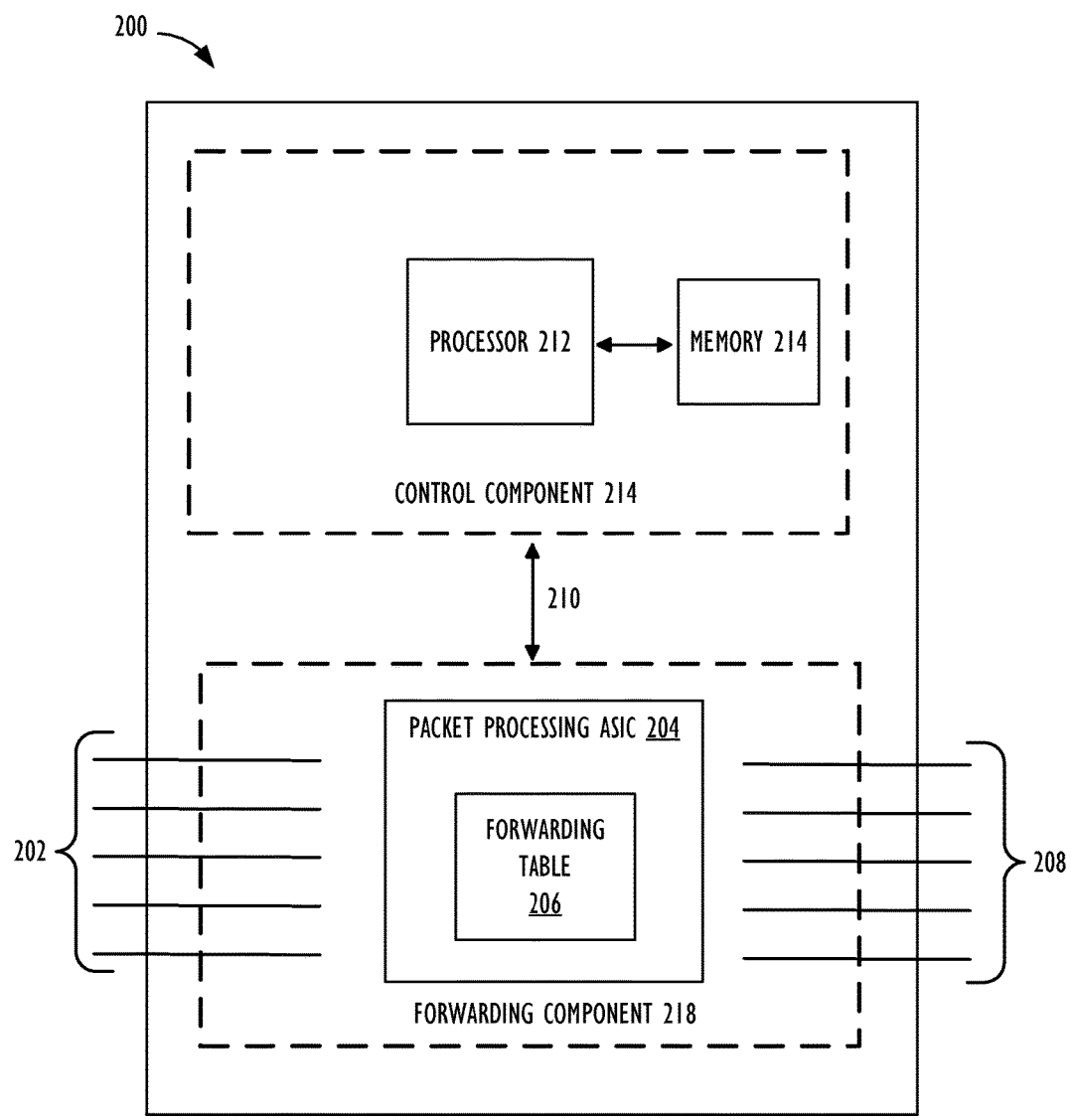
FIG. 2 is a schematic diagram of an embodiment of a network node that comprises a packet processing ASIC configured to forward data packets.

FIG. 2 is a schematic diagram of an embodiment of a network node 200 that comprises a packet processing ASIC 204 configured to forward data packets. The network node 200 may comprise a forwarding component 218 that is configured to perform data plane and/or forwarding plane operations that forward data packets received on the network node ingress ports 202 to the corresponding network node egress port 208 using the packet processing ASIC 204. For example, the packet processing ASIC 204 may be configured to perform data plane operations, such as parse packet headers, manage quality of service, filter of data packets, perform encapsulation, and/or queue data packets. The packet processing ASIC 204 may comprise ASIC ingress ports and ASIC egress ports (not shown in FIG. 2) that are coupled to the network node ingress ports 202 and the network node egress port 208, respectively.

The packet processing ASIC 204 may receive the data packets from the ASIC ingress ports and forward the data packets to the ASIC egress ports using the forwarding table 206. Forwarding table 206 may be a dynamic table that maps destination information found within a data packet, such as a destination address located in the header, to the corresponding ASIC egress ports and network node egress port. In one embodiment, the forwarding table 206 may map the destination MAC address within an Ethernet data packet to one or more ASIC egress ports and network node egress ports. Although FIG. 2 illustrates that network node 200 comprises a packet processing ASIC 204, other special purpose built silicon or custom integrated circuit designs may be used to build and maintain the forwarding tables and perform data and/or forwarding plane operations.

The network node 200 may also comprise a control component 214 that communicates with the forwarding component 218 via Peripheral Component Interconnect Express (PCIe) bus 210. The control component 214 may be configured to perform control plane functions, such as managing routing and signaling protocols and performing other system management functions. For example, the control component 214 may provide network information to the packet processing ASIC 204 to create and update the forwarding table 206. In one embodiment, the functions implemented by the control component 214 may be removed from the network 200, and implemented instead in a centralized controller node. Although FIG. 2 illustrates that network node 200 uses a PCIe bus 210, other types of bus technology may be used to provide communication between the control component 214 and forwarding component 218.

As shown in FIG. 2, the control component 214 may comprise a processor 212 that is coupled to a memory 214. The processor 212 may communicate (e.g., via a system bus)

and/or provide instructions to other components within the network node to implement control plane functions. In one embodiment, the processor 212 may comprise one or more multi-core processors and/or memory media (e.g., cache memory) that function as buffers and/or storage for data. Additionally, processor 212 may be part of one or more other processing components, such as ASICs, field-programmable gate arrays (FPGAs), and/or digital signal processors (DSPs). Although FIG. 2 illustrates that processor 202 may be a single processor, processor 212 is not so limited and instead may represent a plurality of processors.

Memory 214 may be a non-transitory medium configured to store various types of data. For example, memory 214 may include one or more memory devices that comprise secondary storage, read-only memory (ROM), and/or random-access memory (RAM). The secondary storage is typically used for non-volatile storage of data. In certain instances, the secondary storage may be used to store overflow data if the allocated RAM is not large enough to hold all working data. The secondary storage may also be used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and instructions.

Figure 3:
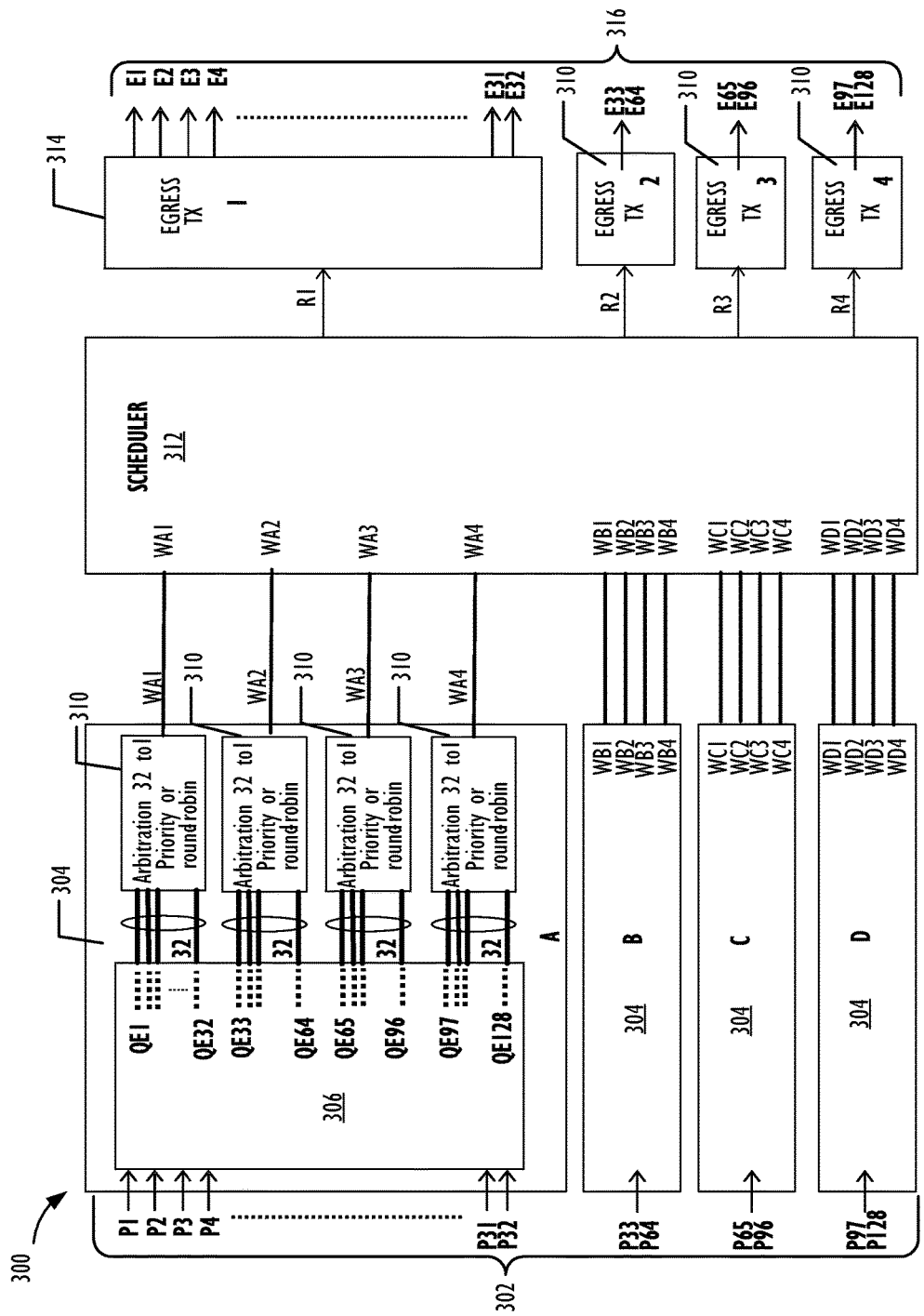
FIG. 3 is a schematic diagram of an embodiment a packet processing ASIC architecture for a network node.

FIG. 3 is a schematic diagram of an embodiment a packet processing ASIC architecture 300 for a network node. Using FIGS. 1 and 2 as an example, the packet processing ASIC architecture 300 may implemented in network nodes 102 and network node 200, respectively. The packet processing ASIC architecture 300 may comprise a plurality of ASIC ingress ports 302, a plurality of packet processors 304, a scheduler 312, a plurality of egress transmission logic blocks 314, and a plurality of ASIC egress ports 316. Although no illustrated in FIG. 3, the packet processing ASIC architecture 300 may also comprise a control interface configured to control and manage the packet processors 304, the scheduler 312, and egress transmission logic blocks 314 and communicate via PCIe bus with other components in a network switching device (e.g., CPU of the network switching device).

As shown in FIG. 3, in one embodiment, the packet processing ASIC architecture 300 may comprise four sets of packet processors 304 and egress transmission logic block 314 and 128 ASIC ingress ports 302 and ASIC egress ports 316. The number of ASIC ingress ports 302 or ASIC egress ports 316 may be greater than the packet processing ASIC architecture's 300 clock speed divided by a network protocol rate. For example, if each ASIC ingress port can pass up to about 15 million data packets in a second for a given ASIC clock speed, the packet processing ASIC architecture 300 may be capable to process about 1920 million data packets a second using 128 ports rather than 480 million packets a second using 32 ports.

In FIG. 3, the packet processors 304 are labeled as A, B, C, and D and the egress transmission logic block 314 are labeled 1, 2, 3, and 4. The ASIC ingress ports 302 and the ASIC egress ports 316 are labeled P1-P128 and E1-E128, respectively. Each of the packet processors A-D 304 are substantially similar to each other except that each of the packet processors 304 are coupled to a different set of ASIC ingress ports 302. Specifically, packet processors A 304 is coupled to ASIC ingress ports P1-P32 302; packet processors B 304 is coupled to ASIC ingress ports P33-P64; packet processors C 304 is coupled to ASIC ingress ports P65-P96 302; and packet processors D 304 is coupled to ASIC ingress ports P97-P128 302. The packet processors 304 may include a packet processing blocks configured to perform a variety of data and/or forwarding plane functions, such as encapsulating data packets, queueing data packets, and mapping data packets received on ASIC ingress ports 302 to corresponding ASIC egress ports 316 using one or more forwarding tables.

The egress transmission logic block 1-4 314 are substantially similar to each other except that each of the egress transmission logic block 314 are coupled to a different set of ASIC egress ports 316. Specifically, egress transmission logic block 1 314 is coupled to ASIC egress ports E1-E32 316; egress transmission logic block 2 314 is coupled to ASIC egress ports E33-E64 316; egress transmission logic block 2 314 is coupled to ASIC egress ports E65-E96 316; and egress transmission logic block 4 314 is coupled to ASIC egress ports E97-E128 316. In one embodiment where the packet processing ASIC operates at a 480 MHz clock speed, each packet processor 304 and egress transmission logic block 314 pair is capable of processing and dequeueing 480 million packets in a second. The egress transmission logic block 1-4 314 may be configured to route data packets received from a scheduler 312 to the proper ASIC egress port 314.

FIG. 3 illustrates that each packet processor 304 comprises a plurality of ingress queues 306. The number of packet processing queues 306 may be correspond to the number of ASIC egress ports 316. As shown in FIG. 3, a total of 128 ingress queues 306 are used to map to the ASIC egress ports 316. The mapping of ingress queues 306 to ASIC egress ports 316 may be 1:1 and may be in sequential order. For example, ingress queue QE1 306 may correspond to ASIC egress port E1 316; ingress queue QE2 306 may correspond to ASIC egress port E2 316, and so forth. Other embodiments, may map the ingress queues 306 to ASIC egress ports 316 using other port mapping method, such as using a random port mapping method. The packet processor 304 may place the received data packets into the ingress queues 306 based on information within and/or associated with the data packet and one or more forwarding tables (not shown in FIG. 3). For example, packet processor 304 may use the destination address, port information, and/or other header information located within the data packet to perform a lookup using one or more forwarding tables to determine which ingress queue 306 to place the data packet in.

The ingress queues 306 may be partitioned into different groups such that each group comprises a portion of the ingress queues 306 and is coupled to an output arbitrator 310. Each of the partitioned ingress queues 306 may correspond to a respective egress transmission logic block 314. For example, ingress queues 1-32 306 may form a first queue group that corresponds to egress transmission logic block 1 314 and provide inputs to an output arbitrator 1 310; ingress queues 33-64 306 may form a second queue group that corresponds to egress transmission logic block 2 314 and provides inputs to an output arbitrator 2 310; ingress queues 65-96 306 may form a third queue group that corresponds to egress transmission logic block 3 314 and provides inputs to an output arbitrator 3 310; and ingress queues 97-128 306 may form a third queue group that corresponds to egress transmission logic block 4 314 and provides inputs to an output arbitrator 4 310.

The output arbitrator 1-4 310 may be configured to determine the priority to transmit packets received from ingress queues 306 to the scheduler 312. Ingress queues 306 that have a data packet ready to transmit may provide a ready to transmit signal to the output arbiter 310. The output arbiter 310 subsequently selects one of the data packet for ingress queues 306 that are ready to transmit within a group of ingress queues. In one embodiment, the output arbitrator 310 can implement a round robin scheme or some other form of a priority scheme for selecting a data packet from ready to transmit ingress queues 306. The output arbitrator 310 may output a request to the scheduler 312. The number of output arbitrator 310 and outputs from the output arbitrator 310 are based on the number of ingress queues 306 groups and/or the number of egress transmission logic block 314.

In one alternative, not shown in FIG. 3, is the actual packet storage. Data packets may be stored in a common memory, either common for the entire packet processing ASIC 300 or common for each packet processor 304. The ingress queues 306 may include pointers to the actual data packet and other necessary information rather than the data packets. Data packets may be provided from the ASIC ingress ports 302 to the common memory and may be retrieved by the egress transmission logic block 314 for the corresponding ASIC egress ports 314.

Referring to the packet processor A 304, the packet processor A 304 classifies each received data packet using data packet information and the forwarding table to determine which of the ASIC egress ports 316 to forward the data packet. The data packet is then placed in one of the ingress queues 306 within packet processor A 304 using information associated and/or from the data packet (e.g., port and/or head information) to perform a lookup operation in a forwarding table. Each group of ingress queues 306 may correspond to a respective egress transmission logic block 314. Specifically, the data packet is queued into ingress queues QE1-QE32 306 if the ASIC egress port 316 is E1-E32, which respectively correspond to egress transmission logic block 1 314; the data packet is queued into ingress queues QE33-QE64 306 if the ASIC egress port 316 is E33-E64, which respectively corresponds to egress transmission logic block 2 314; the data packet is queued into ingress queues QE65-QE96 306 if the ASIC egress port 316 is E65-E96, which respectively corresponds to egress transmission logic block 3 314; the data packet is queued into ingress queues QE97-QE128 306 if the ASIC egress port 316 is E97-E128, which respectively corresponds to egress transmission logic block 4 314.

Each ingress queue QE1-QE128 306 provides a request output signal if it contains data packets that can be transmitted to the output arbitrator 310. The ingress queues QE1-QE128 306 in the packet processor 304 may participate in the arbitration if it has a data packet and the destination ASIC egress port 316 is available, and hence, it is not necessary that all of the 16 data outputs from the output arbitrators 310 are valid at every clock cycle.

If each of the egress transmission logic block 314 processes one data packet per clock cycle, the output arbitrator 310, for each clock cycle, may select a data packet received from each group of ingress queues 306 (e.g., QE1-QE32) and transmit requests corresponding to the selected data packets for each egress transmission logic block 314. In FIG. 3, WA1 may be a request that corresponds to the selected data packet for all of requests corresponding to egress transmission logic block 1314; WA2 may be a request that corresponds to the selected data packet for all of requests corresponding to egress transmission logic block 2 314; WA3 may be a request that corresponds the selected data packet for all of requests corresponding to egress transmission logic block 3 314; and WA4 may be request that corresponds to the selected data packet for all of requests corresponding to egress transmission logic block 4.

Similar mappings may be used for WB1-WB4, WC1-WC4, and WD1-WD4 for packet processors B, C, and D 304, respectively. For example, WB1 may correspond to the selected data packet for all of requests corresponding to egress transmission logic block 1314; WB2 may be a request that corresponds to the selected data packet for all of requests corresponding to egress transmission logic block 2 314; WB3 may be a request that corresponds to the selected data packet for all of requests corresponding to egress transmission logic block 3; and WB4 may be a request that corresponds to the selected data packet for all of requests corresponding to egress transmission logic block 4.

WC1 may be a request that corresponds to the selected data packet for all of requests corresponding to egress transmission logic block 1314; WC2 may be a request that corresponds to the selected data packet for all of requests corresponding to egress transmission logic block 2 314; WC3 may be a request that corresponds to the selected data packet for all of requests corresponding to egress transmission logic block 3; WC4 may be a request that corresponds to the selected data packet for all of requests corresponding to egress transmission logic block 4.

WD1 may be a request that corresponds to the selected data packet for all of requests corresponding to egress transmission logic block 1314; WD2 may be a request that corresponds to the data packet for all of requests corresponding to egress transmission logic block 2 314; WC3 may be a request that corresponds to the selected data packet for all of requests corresponding to egress transmission logic block 3 314; and WD4 may be a request that corresponds to the data packet for all of requests corresponding to egress transmission logic block 4 314.

The scheduler 312 may receive the requests from the output arbitration 310, where the number of requests the scheduler 312 receives as inputs may depend on the number of egress transmission logic block 314 and/or the number of partitions for ingress queues 306 within a packet processor 304. Using FIG. 3 as an example, the scheduler 312 may receive a total of 16 request inputs, four from each of the packet processors 304. The 16 requests consist of four requests for egress transmission logic block 1 314 (e.g., WA1, WB1, WC1, WD1); four requests for egress transmission logic block 2 314 (e.g., WA2, WB2, WC2, WD2); four requests for egress transmission logic block 3 314 (e.g., WA3, WB3, WC3, WD3); and four requests for egress transmission logic block 4 314 (e.g., WA4, WB4, WC4, WD4).

Each of the egress transmission logic block 314 can service a single request in a single clock cycle. To ensure that the egress transmission logic block 314 services the single request, the scheduler 312 may be configured to resolve the 16 requests generated by the output arbitrator 310 to four output requests R1, R2, R3, and R4 that are inputted into the egress transmission logic block 1-4 314, respectively. To select the four output requests R1, R2, R3, and R4, the scheduler may generate the possible combinations of connecting the four packet processors A-D 304 with the four egress transmission logic block 1-4 314. Table 1 below shows the 24 possible combinations.

TABLE 1

| Combination | R1 | R2 | R3 | R4 |
| --- | --- | --- | --- | --- |
| 1 | WA1 | WB2 | WC3 | WD4 |
| 2 | WA1 | WB2 | WD3 | WC4 |

TABLE 1-continued

| Combination | R1 | R2 | R3 | R4 |
|---|---|---|---|---|
| 3 | WA1 | WC2 | WB3 | WD4 |
| 4 | WA1 | WC2 | WD3 | WB4 |
| 5 | WA1 | WD2 | WB3 | WC4 |
| 6 | WA1 | WD2 | WC3 | WB4 |
| 7 | WB1 | WA2 | WC3 | WD4 |
| 8 | WB1 | WA2 | WD3 | WC4 |
| 9 | WB1 | WC2 | WA3 | WD4 |
| 10 | WB1 | WC2 | WD3 | WA4 |
| 11 | WB1 | WD2 | WA3 | WC4 |
| 12 | WB1 | WD2 | WC3 | WA4 |
| 13 | WC1 | WA2 | WB3 | WD4 |
| 14 | WC1 | WA2 | WD3 | WB4 |
| 15 | WC1 | WB2 | WA3 | WD4 |
| 16 | WC1 | WB2 | WD3 | WA4 |
| 17 | WC1 | WD2 | WA3 | WB4 |
| 18 | WC1 | WD2 | WB3 | WA4 |
| 19 | WD1 | WA2 | WB3 | WC4 |
| 20 | WD1 | WA2 | WC3 | WB4 |
| 21 | WD1 | WB2 | WA3 | WC4 |
| 22 | WD1 | WB2 | WC3 | WA4 |
| 23 | WD1 | WC2 | WA3 | WB4 |
| 24 | WD1 | WC2 | WB3 | WA4 |

In Table 1, each combination represents the scheduler's 312 selection for output requests R1, R2, R3, and R4. For example, if scheduler 312 determines to use combination/row 1 as the output requests R1, R2, R3, and R4, then packet processor A 304 is connected to egress transmission logic block 1 314, packet processor B 304 is connected to egress transmission logic block 2 314, packet processor C 304 is connected to egress transmission logic block 3 314, and packet processor D 304 is connected to egress transmission logic block 4 314. If scheduler 312 determines to use combination/row 2 as the output requests R1, R2, R3, and R4, then packet processor A 304 is connected to egress transmission logic block 1314, packet processor B 304 is connected to egress transmission logic block 2 314, packet processor D 304 is connected to egress transmission logic block 3 314, and packet processor C 304 is connected to egress transmission logic block 4 314. If scheduler 312 determines to use combination/row 3 as the output requests R1, R2, R3, and R4, then packet processor A 304 is connected to egress transmission logic block 1314, packet processor C 304 is connected to egress transmission logic block 2 314, packet processor B 304 is connected to egress transmission logic block 3 314, and packet processor D 304 is connected to egress transmission logic block 4 314. The connections for the remaining combinations in Table 1 provide connections to the packet processor 304 to the egress transmission logic blocks 314 in the same manner.

Not all of the requests received from the output arbitrator 310 by the scheduler 312 may be active. For example, from the 24 combinations in Table 1 shown above, one or more combinations may produce four, three, two, one and/or no connections at all. The scheduler 312 may use a multiplexer to examine the combinations in the table and select a row/combination with the highest number of connections made. In one embodiment, the scheduler 312 may comprise 24 adders, where each adder is associated with one of the combinations/rows. The inputs to each adder are the specified requests (e.g., WA1-WD4) from the output arbitrator 310 of the packet processor 304, where a request may have a value of one and a no request may have a value of zero. For each combination in Table 1, four active requests produce a value of four, three active requests produce a value of three and so on. Then the scheduler 312 may compare the sums outputted by the 24 adders and select the combination with the highest value. When multiple rows have the same number of connections, the scheduler 312 may use a round robin and/or other random selection process to rotate the selection among the combinations with the highest value.

Using Table 1 as an example, assume combination/row n has four requests and no other combination/row within Table 1 has four requests. Then, scheduler 312 may select combination/row n to output to ASIC egress ports 314 and forward data packets from packet processor B 304 QE1 . . . QE32 to egress transmission logic block 1. Similarly, scheduler 312 may forward data packets from packet processor D 304 QE33 . . . QE64 to egress transmission logic block 1, forward data packets from packet processor A 304 QE65 . . . QE96 to egress transmission logic block 3 and forward data packets from packet processor C 304 QE97 . . . QE128 to egress transmission logic block 4.

In this manner a 128 port packet processing ASIC can be developed where the clock speed of the packet processing ASIC is divided by the data packets per second at a port ratio only indicates 32 ports per ASIC. The above example uses four packet processors 304 and four egress transmission logic block 314 pairs. A larger number, such as six or eight, ways or blocks could be used but the number of combinations grows rapidly enough to potentially limit the gains available related to the additional ASIC gates or area utilized. Use of four packet processors 304 may be considered optimal.

Figure 4:
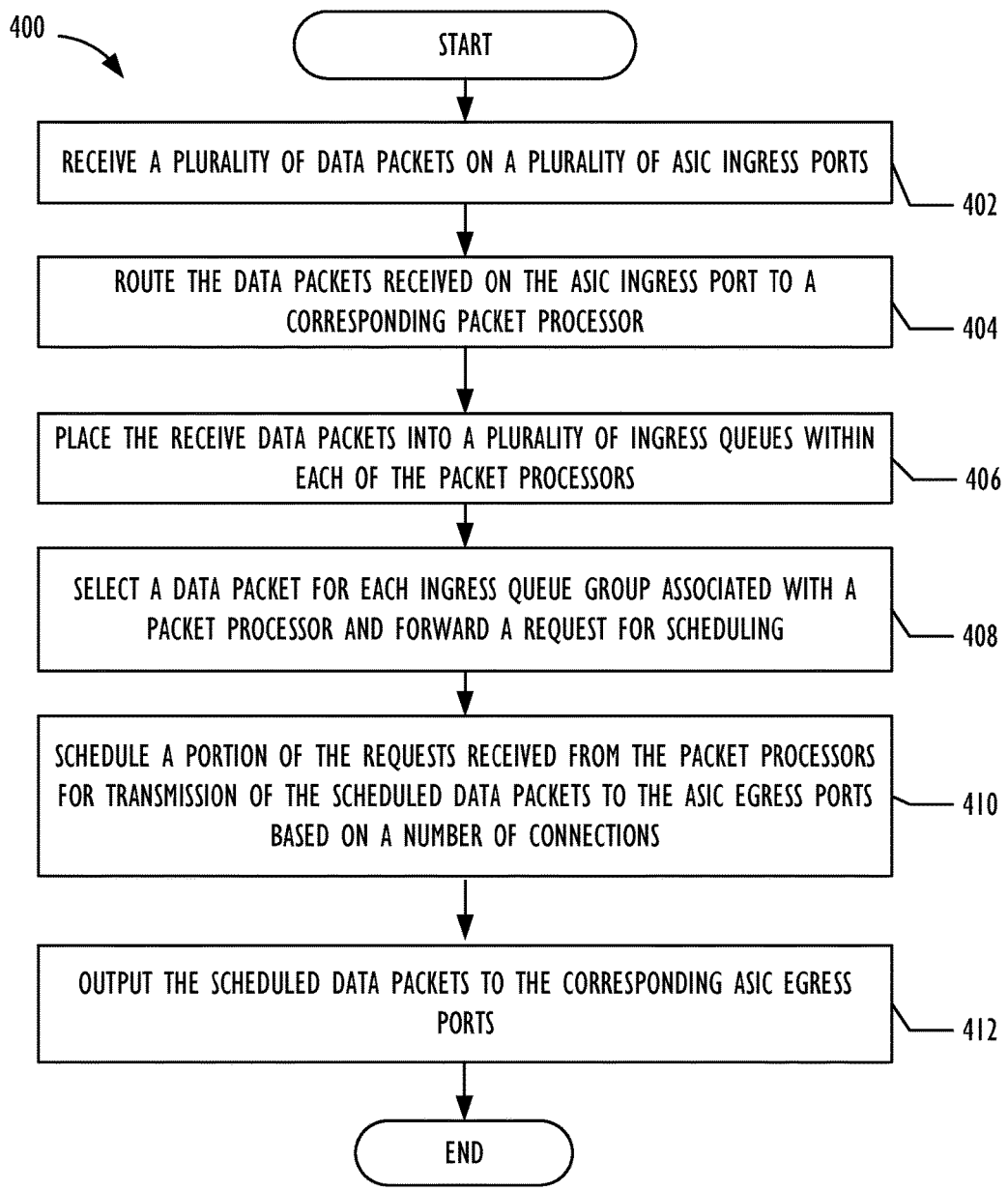
FIG. 4 is a flow chart of an embodiment of a method for forwarding data packets received on ASIC ports, where the number of ASIC ports is greater than the ASIC clock speed divided by a network protocol rate.

FIG. 4 is a flow chart of an embodiment of a method 400 for forwarding data packets received on ASIC ports, where the number of ASIC ports are greater than the ASIC clock speed divided by a network protocol rate. Method 400 may be implemented using the network node 200 and the packet processing ASIC architecture 300 in FIGS. 2 and 3, respectively. Method 400 may start at block 402 and receive a plurality of data packets on a plurality of ASIC ingress ports. The ASIC ingress ports may be able to support a set number of data packets based on a data rate of the networking protocol, such as 10 Gigabit Ethernet. In one embodiment, the number of ASIC ingress ports may exceed the ASIC clock speed divided by a network protocol rate.

Method 400 may then move to block 404 and route the data packets received on the ASIC ingress port to a corresponding packet processor. Method 400 may assign each of the ASIC ingress ports to one of the packet processors in a sequential order as shown in FIG. 3. Specifically, method 400 may assign the first group of 32 ingress ports P1-P32 to the first packet processor, the second group of 32 ingress ports P33-P64 to the second packet processor, the third group of 32 ingress ports P65-P96 to the third packet processor, and the fourth group of 32 ingress ports P97-P128 to the fourth packet processor. Other embodiments at block 404 may use other types of port assignment techniques, such as using a random assignment, to assign the ASIC ingress ports to the packet processors.

Method 400 may then move to block 406 and place the receive data packets into a plurality of ingress queues within each of the packet processors. For example, each of the packet processors may have a total number of ingress queues that match the total number of ASIC egress ports that have a 1:1 mapping to an ASIC egress port. In one embodiment, the ingress queues may be assigned to an ASIC egress port in sequential order as discussed and illustrated in FIG. 3. Other embodiments of method 400 may map or assign the ingress queues to the ASIC egress ports using other port assignment techniques, such as using a random port assignment.

Method 400 may then move to block 408 and select a data packet for each ingress queue group associated with a packet processor and forward a request for scheduling. As described in FIG. 3, each of the packet processors may partition the ingress queue into different groups. For example, a packet processor may have a total of 128 ingress queues, where the 128 ingress queues are divided into a set of four ingress queue groups, where each ingress queue group may have 32 ingress queues. Within each ingress queue group, method 400 may determine which ingress queue within the group to schedule for forwarding to an ASIC egress port. In one embodiment, method 400 may rank the priorities of the data packets within the ingress queues. In another embodiment method 400 may perform a round-robin selection process. Other embodiments of method 400 may implement other selection processes, such as first-in-first out and/or weighted fair queues.

Method 400 may then move to block 410 and schedule a portion of the requests received from the packet processors for transmission of the scheduled data packets to the ASIC egress ports based on a number of connections. Method 400 may receive a number of requests from the packet processors that exceed the number of egress transmission logic blocks used to route data packets to the ASIC egress ports. Method 400 may produce scheduling combinations based on the number of egress transmission logic blocks (e.g., R1-R4 in FIG. 3). For example, if the number of egress transmission logic blocks is four and the number of received requests is sixteen, method 400 may produce 24 different scheduling combinations and select one of the combinations for forwarding data packets to the ASIC egress port. The different scheduling combinations may be ranked by the number of connections produced for each combination. The scheduling combination with the most number of connections may be selected for providing data packets to be forwarded to the ASIC egress ports.

Method 400 may then move to block 412 and output the scheduled data packets to the corresponding ASIC egress ports. In one embodiment, method 400 may forward the scheduled data packets from the ingress queues to the ASIC egress ports. In another embodiment, method 400 may have stored data packets in a common memory, either common for the entire packet processing ASIC 300 or common for each packet processor 304. The ingress queues may include pointers to the actual data packet and other necessary information rather than the data packets. To output the scheduled data packets, method 400 may retrieve the scheduled data packets from the common memory and output the scheduled data packets to the corresponding ASIC egress ports.

Therefore in a preferred embodiment a switch ASIC has a plurality of packet processor and egress logic pairs, each having a number of ports equal to the ASIC clock speed divided by the number of packets per second that each port can process for a desired packet protocol are present. Each packet processor has ingress queues for each port of the switch ASIC. The queues are grouped to conform to each egress logic element. Each group contains an arbiter to determine the queue to provide a packet for that cycle. A scheduler receives the output of each group of each packet processor and selects the combination having the most packets to be transferred. These packets are then passed to the respective egress logic, which in turn transmit the packets form the switch ASIC. The use of the groups, arbitration and scheduling allows the total number of ports of the ASIC to exceed the ASIC clock speed divided by the number of packets per second of the desired network protocol. By handling this larger number of ports at frill speed, fewer ASICs are needed for large port count switches.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of.

The above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A network switch ASIC comprising:
M times N input ports conforming to a given networking protocol;
M times N output ports conforming to the given networking protocol;
a plurality of M packet processors and of M egress transmission logic blocks, wherein each packet processor has N ports coupled to N input ports and each egress transmission logic block has N ports coupled to N output ports, wherein each packet processor has M outputs and each egress transmission logic block has one input, wherein each one of the packet processor M outputs of a given packet processor is corresponded to a different one of the egress transmission logic block inputs, wherein N is substantially equal to an ASIC clock speed divided by a number of packets per second that each port can process based on the given network protocol, and wherein M is greater than one; and
a scheduler coupled to the plurality of M packet processors and M egress transmission logic blocks, wherein the scheduler is configured to receive the M outputs of each of the packet processors and provide the input of each egress transmission logic block.

2. The network switch ASIC of claim 1, wherein the M outputs of each packet processor indicate the availability of a packet to be transmitted by a respective egress transmission logic block.

3. The network switch ASIC of claim 1, wherein the scheduler is further configured to:
determine a plurality of combinations of the M outputs of the packet processors to determine which of the M outputs of each of the packet processors are provided to each egress transmission logic block; and select one of the combinations based on the number of connections associated with each of the combinations.

4. The network switch ASIC of claim 3, wherein the selected combination provides the most connections.

5. The network switch ASIC of claim 4, wherein if at least two of the combinations provide the most connections, the scheduler is further configured to perform a round robin selection between the at least two combinations of outputs.

6. The network switch ASIC of claim 3, wherein each packet processor includes M time N queues for receiving packets, the queues grouped in M groups, each group providing one of the M outputs of the packet processor, and wherein the number of connections for each M outputs of each packet processor is based on whether one or more queues within each of the M groups in the packet processor are ready to forward data packets and the corresponding destination ASIC egress port is available.

7. The network switch ASIC of claim 1, wherein each packet processing includes:

M time N queues for receiving packets, the queues grouped in M groups, each group providing one of the M outputs of the packet processor; and a plurality of M arbiters, one arbiter associated with each group to determine the queue of the group to provide the output for the group.

8. The network of ASIC of claim 1, wherein the given network protocol is 10 Gigabit per second Ethernet.

9. The network of ASIC of claim 8, wherein the ASIC clock speed is 480 MHz, N has a value of 32 and M has a value of 4.

10. A network switch comprising:
a control component including:
a processor having an output; and
a memory coupled to the processor, the memory including non-volatile memory for storing instructions executed by the processor and volatile memory for use by the processor;
M times N switch input ports conforming to a given networking protocol;
M times N switch output ports conforming to the given networking protocol; and
switch custom integrated circuit including:
M times N circuit input ports coupled to the M times N switch input ports;
M times N circuit output ports coupled to the M times N switch output ports;
a plurality of M packet processors and of M egress transmission logic blocks, wherein each packet processor has N ports coupled to N circuit input ports and each egress transmission logic block has N ports coupled to N circuit output ports, wherein each packet processor has M outputs and each egress transmission logic block has one input, wherein each one of the packet processor M outputs of a given packet processor is corresponded to a different one of the egress transmission logic block inputs, wherein N is substantially equal to an integrated circuit clock speed divided by a number of packets per second that each port can process based on the given network protocol, and wherein M is greater than one; and
a scheduler coupled to the plurality of M packet processors and M egress transmission logic blocks, wherein the scheduler is configured to receive the M outputs of each of the packet processors and provide the input of each egress transmission logic block.

11. The network switch of claim 10, wherein each M packet processor comprises a plurality of M times N queues for receiving incoming packets.

12. The network switch of claim 10, wherein the M outputs of each packet processor indicate the availability of a packet to be transmitted by a respective egress transmission logic block.

13. The network switch of claim 10, wherein the scheduler is further configured to:

determine a plurality of combinations of the M outputs of the packet processors to determine which of the M outputs of each of the packet processors are provided to each egress transmission logic block; and select one of the combinations based on the number of connections associated with each of the combinations.

14. The network switch of claim 13, wherein the selected combination provides the most connections.

15. The network switch of claim 14, wherein if at least two of the combinations provide the most connections, the scheduler is further configured to perform a round robin selection between the at least two combinations of outputs.

16. The network switch of 13, wherein each packet processor includes M time N queues for receiving packets, the queues grouped in M groups, each group providing one of the M outputs of the packet processor, and wherein the number of connections for each M outputs of each packet processor is based on whether one or more queues within each of the M groups in the packet processor are ready to forward data packets and the corresponding destination ASIC egress port is available.

17. The network switch ASIC of claim 10, wherein each packet processing includes:

M time N queues for receiving packets, the queues grouped in M groups, each group providing one of the M outputs of the packet processor; and a plurality of M arbiters, one arbiter associated with each group to determine the queue of the group to provide the output for the group.

18. A method comprising:
receiving a plurality of data packets from M times N input ports;
routing the data packets to M packet processors that each include N input ports and M output ports, wherein N is determined from an maximum clock speed of a packet processing custom integrated circuit divided by the maximum data rate of each of the input ports;
scheduling the data packets for forwarding from the M packet processors to M egress transmission logic blocks that each include one input port and N output ports; and
forwarding the scheduled data packets out M time N output ports,
wherein each one of the packet processor M outputs of a given packet processor is corresponded to a different one of the egress transmission logic block inputs, and wherein M is greater than one.

19. The method of claim 18, wherein each packet processor has M outputs and wherein scheduling the data packets for forwarding from the M packet processors to M egress transmission logic blocks comprises:

determining a plurality of combinations to determine which of the M outputs of each of the packet processors are provided to each egress transmission logic block; and selecting one of the combinations based on the number of connections associated with each of the combinations.

20. The method of claim 19, wherein the selected combination provides the most connections, and wherein if at least two of the combinations provide the most connections, the packet processing custom integrated circuit is further adapted to perform a round robin selection between the at least two combinations of outputs.

* * * * *